UNITED STATES PATENT OFFICE.

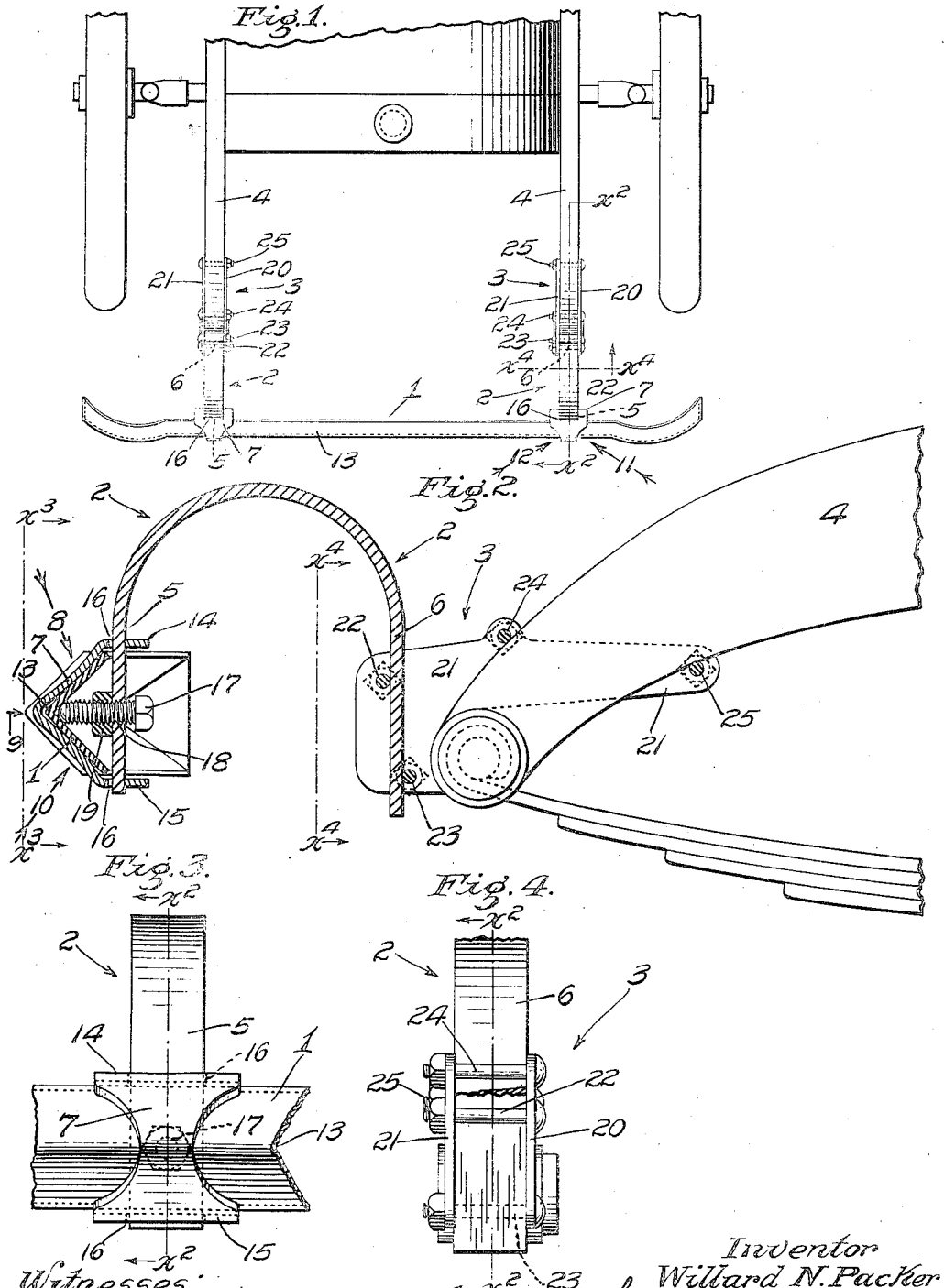

WILLARD N. PACKER, OF LOS ANGELES, CALIFORNIA, ASSIGNOR, BY DIRECT AND MESNE ASSIGNMENTS, TO THOMAS PELHAM LIDE, OF LOS ANGELES, CALIFORNIA.

BUFFER FOR AUTOMOBILES.

1,104,443.        Specification of Letters Patent.     Patented July 21, 1914.

Application filed April 28, 1913. Serial No. 764,265.

*To all whom it may concern:*

Be it known that I, WILLARD N. PACKER, a citizen of the United States, residing at Los Angeles, in the county of Los Angeles and State of California, have invented a new and useful Buffer for Automobiles, of which the following is a specification.

The general object of the invention is to provide a buffer which shall be gainly in appearance, strong in construction and perfectly satisfactory in its buffing action; but a more particular object is to provide a buffer of very simple construction which shall be universally resilient in all directions so that it will effectively resist shocks and blows impressed from any direction whatsoever. Though the buffer will protect the front of the automobile to which it is attached against collision of any sort, it is particularly effective in preventing damage from other automobiles that may back up onto the one equipped with the buffer. As will hereinafter be described, the construction of this buffer is admirably adapted to withstand the rolling action of the rear wheels of a backing automobile, and this buffer will not be damaged by the ordinary collisions thus occurring.

Other objects may appear in the following detail description, or by consideration of the drawings.

The accompanying drawings illustrate the invention.

Figure 1 is a plan view showing a fragment of an automobile with the buffer attached thereto. Fig. 2 is an enlarged view showing a fragment of the automobile frame with the buffer attached thereto. The buffer is shown in section on lines $x^2$, Figs. 1, 3 and 4. Fig. 3 is a front view of a fragment of the buffer as viewed from the line $x^3$, Fig. 2. Fig. 4 is a fragmental view of a portion of the buffer as viewed from lines $x^4$, Figs. 1 and 2.

In its broadest sense, this invention includes a buffer bar 1 of any construction whatsoever, universally resilient means in the form of U-shaped bands 2 for supporting the bar, and clamping means 3 for connecting the universally resilient means 2 to the automobile frame 4 of Fig. 1. The universally resilient means just referred to are shown as comprising two metal bands preferably made of springy steel and said bands are shown as an inverted U having forward and rearward legs 5 and 6, Fig. 2, respectively. For the purpose of connecting the bands 2 to the bar 1, any suitable dogs 7 may be provided. The broad construction thus far described involves a basic advance over prior automobile buffers. By mounting the buffer bar 1 on U-shaped springs as described, the device will, without damage, withstand downward, forward or upward shocks in the direction of arrows 8, 9 and 10, Fig. 2 respectively, and will also withstand glancing shocks in the direction of arrows 11 and 12, Fig. 1. The ability of the buffer to stand up against shocks of all these varieties is made possible because means 2 are universally resilient for all directions in which the shocks are encountered.

It is particularly pointed out that the U-shape of the bands 2 is relied upon to obtain resiliency to amply withstand the shocks imposed upon it and at the same time obtain sufficient lateral stiffness of the bands to prevent excessive twisting and lateral deflection of the bands under sidewise shocks, and such stiffness could not be obtained by, for instance, S-shaped bands, or by W-shaped bands.

Considering further the details of the construction actually shown, the buffer bar 1 is seen to be of angular section having the apex 13, Fig. 2, to the front. The dogs 7 are also shown as embracing the buffer bar and as having the two leaves 14 and 15 extending backward from said bar from the upper and lower edges respectively thereof. In these leaves are cut the elongated apertures 16 and the forward legs 5 of bands 2 pass through said apertures. A set screw 17 is threaded through the forward leg of each band, said set screw being adapted to abut the angular buffer bar from the rear and adjacent the apex thereof, as shown in Fig. 2. From the foregoing it will be obvious that as the set screw 17 is screwed through the threaded aperture 18 as in Fig. 2, and against the apex of the angular buffer bar, the leg 5, dog 7 and buffer bar 1 will all be firmly bound together. It will also be seen that by loosening the set screw 17, the dogs 7 may be slid along bar 1 and refastened at any point, so that the buffer device may be adjusted for the width of any ordinary automobile frame. If in a collision the buffer should suffer a direct horizontal blow in the direction of arrow 9, Fig. 2, the force would be imparted onto screw 17 and might strip the threads thereof past the threads in aperture 18. To avoid injury of this sort, a nut 19 is screwed along screw 17 until it abuts leg 5, as shown in Fig. 2. With this provision the direct horizontal shock will be borne by the nut 19 acting on leg 5, and the integrity of the threads on the screw and in aperture 18 will be preserved.

Turning now to means 3 for clamping the band 2 to the automobile frame, said means are seen to comprise two side plates 20 and 21, Figs. 1, 2 and 4. Four bolts 22, 23, 24 and 25 pass through these plates, and of these bolts the first two are particularly adapted to bind the plates rigidly onto the rear leg 6 of band 2, while the latter two of said bolts are particularly adapted to bind the plates and the whole buffer to the automobile frame 4. The bolt 22 is seen to lie ahead of leg 6, while the bolt 23 lies behind said leg. These bolts are screwed down hard onto the plates 20 and 21 until said plates bind leg 6 absolutely and firmly. With bolt 25 temporarily removed, the clamping means may then be placed on frame 4, as in Fig. 2. The bolt 25 is then put in position and bolts 24 and 25 are both set up hard so as to rigidly bind the clamping means of the whole buffer to said frame. With reference to the angular section of the buffer bar, it is noticed that shocks coming onto said bar, either in the direction of arrows 8 or of arrow 10, tend to glance off from the same and thereby greatly reduce the effect of said shock, and so tend to spare the remaining buffer parts and the automobile from injurious action.

I claim:

1. A buffer to be attached to an automobile frame, said buffer comprising a buffer bar; universally resilient means for supporting said bar, said means comprising resilient U-shaped metal bands, each of which bands has but two legs both projecting downwardly one behind the other; dogs for connecting the forward legs of said bands to said buffer bar; and clamps for attaching the rearward legs of said bands to the automobile frame.

2. A buffer to be attached to an automobile frame, said buffer comprising a buffer bar of angular section, the apex of said angular section being to the front; two dogs embracing said buffer bar, each of said dogs having two leaves extending backward from said bar, said leaves having elongated apertures therein; a U-shaped resilient metal band for each of said dogs, each of said bands having two legs, the forward of said legs passing through the two elongated apertures in the leaves of said dogs; a set-screw threaded through the forward leg of each of said bands between said apertures in the leaves of the dogs; said set-screw being adapted to abut the angular buffer bar from the rear and adjacent the apex thereof; a lock nut on each of said set-screws between the apex of said buffer bar and the forward leg of each band; and clamping means for each of said bands, said clamping means being adapted to attach the rearward legs of said bands to the automobile frame.

3. A buffer bar, dogs embracing the buffer bar and provided with apertures; U springs having forward and rear legs which are in the apertures, said forward legs being provided with threaded apertures; bolts screwed through the threaded apertures and engaging the buffer bar, and means to fasten the rear legs to an automobile frame.

4. A buffer bar, dogs embracing the buffer bar and provided with apertures, resilient members each having one of its ends located in the apertures of one of said dogs, said ends being provided with threaded apertures, bolts screwed through the threaded apertures and engaging the buffer bar, and means to fasten the other ends of said resilient means to an automobile frame.

5. A buffer to be attached to an automobile frame, said buffer comprising a buffer bar, resilient means for supporting said bar, said means comprising resilient metal bands, each of said bands having two legs, a dog of channel cross-section and adapted to clamp said bar against one of said legs, and means for attaching the other leg to the automobile frame.

6. A buffer bar, dogs embracing the bar and provided with apertures, springs having forward and rear legs, each of said forward legs being located in the apertures of one of said dogs, there being threaded apertures in said forward legs, bolts screwed through the threaded apertures and engaging the buffer bar, and means to fasten the rear legs to an automobile frame.

7. A buffer having resilient means to be attached to an automobile frame, a buffer bar, and means for connecting said buffer bar to said resilient means, said connecting means comprising plates each adapted to form an orifice with said resilient means to receive said bar, and means to fasten said bar in said orifice.

8. A buffer to be attached to an automobile frame, said buffer comprising a buffer bar; resilient metal bands for supporting said bar, said bands having two downwardly projecting legs, one behind the other, means for connecting the forward legs of said bands to said buffer bar; and clamping means, one for each rearward leg for attaching the rearward legs to the automobile frame, each of said clamping means comprising two plates between which a rearward leg and a portion of the frame of the automobile is clamped, and bolts for drawing the plates together.

In testimony whereof, I have hereunto set my hand at Los Angeles California this 22d day of April 1913.

WILLARD N. PACKER.

In presence of—
 JAMES R. TOWNSEND,
 ROBERT A. STEPS.